E. F. GEBHARDT.
VALVE FOR HOT WATER HEATING SYSTEMS.
APPLICATION FILED OCT. 30, 1908.
917,579.
Patented Apr. 6, 1909.
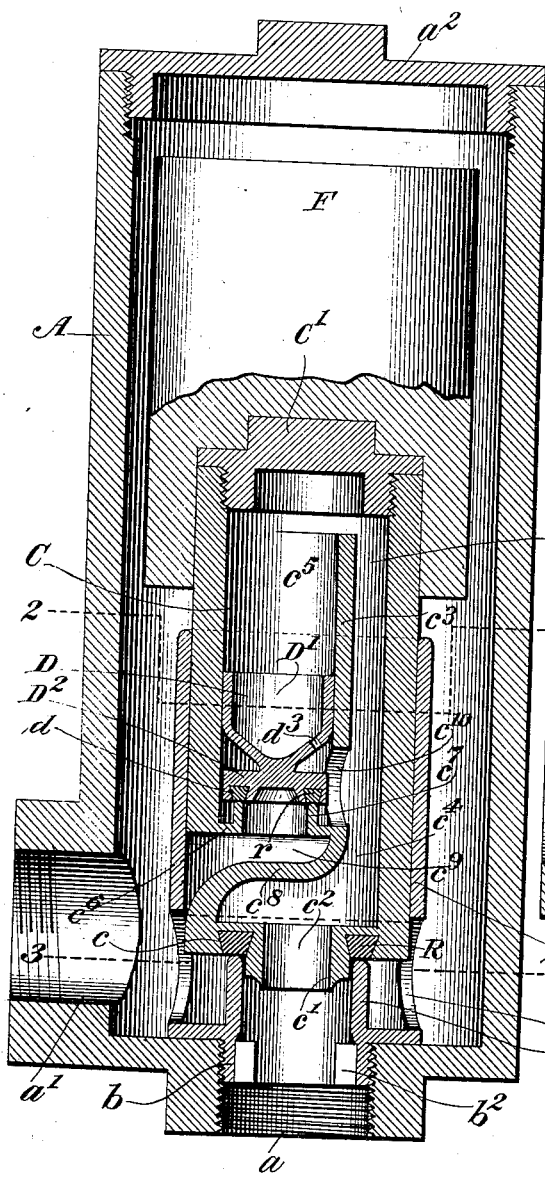
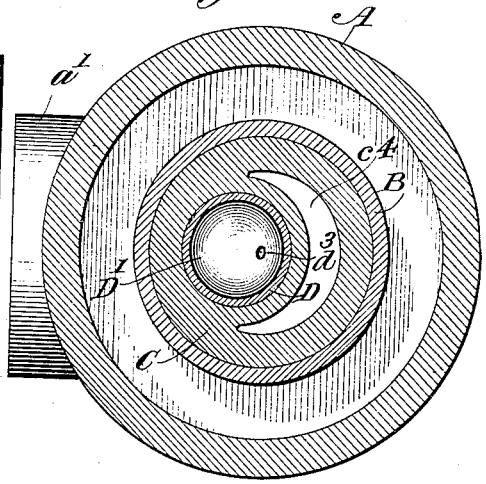
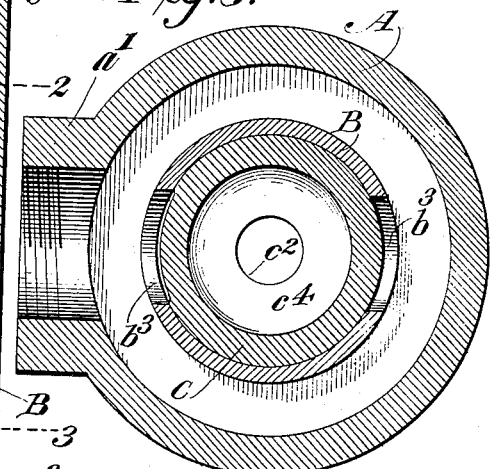
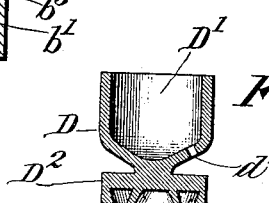
Inventor:
Edmund F. Gebhardt
Witnesses:

UNITED STATES PATENT OFFICE.

EDMUND F. GEBHARDT, OF EASTON, PENNSYLVANIA.

VALVE FOR HOT-WATER HEATING SYSTEMS.

No. 917,579.   Specification of Letters Patent.   Patented April 6, 1909.

Application filed October 30, 1908. Serial No. 460,229.

*To all whom it may concern:*

Be it known that I, EDMUND F. GEBHARDT, of Easton, in the county of Northampton and State of Pennsylvania, have invented certain new and useful Improvements in Valves for Hot-Water Heating Systems; and I hereby declare that the following is a full, clear, and exact description thereof, reference being had to the accompanying drawings, which form part of this specification.

This invention is a novel valve particularly designed for regulating the pressure in hot water heating systems; and the object of the invention is to produce a valve which will be reliable under all conditions of service; that will maintain a uniform pressure in the system and never lose control thereof; that will be non-sticking and non-choking, and not liable to be disordered by deposit of any foreign matters such as scale, sand or chips which may happen to get into the system.

A further object is to so construct the valve that all the parts thereof are easily accessible and can be removed for examination when desired without taking down any part of the heating system or destroying any of the connections thereof.

I will now explain the invention in connection with the accompanying drawings of such a valve, which drawings form part of this specification, so that any one skilled in the art can readily construct and use same.

In the drawings—Figure 1 is a vertical sectional view of the complete valve in normal closed position. Fig. 2 is a transverse section on line 2—2, Fig. 1. Fig. 3 is a similar section on line 3—3, Fig. 1. Fig. 4 is a detail vertical section of the return check-valve.

The valve comprises a cylindrical casing A having an inlet $a$ in its bottom adapted to be connected by suitable piping (not shown) to the fluid heating system (not shown). Said casing also has an outlet $a'$ adapted to be connected to an overflow tank or reservoir in the usual way (not shown). The casing has its upper end closed by a removable plug $a^2$ which is threaded thereto as indicated in the drawings.

Within the casing A is a cylinder B which is of less diameter than the casing and has an opening in its bottom surrounded by a threaded depending flange $b$ which is threaded exteriorly to engage with internal threads in the opening $a$ in the bottom of the casing, and by which means cylinder B may be secured centrally within the casing A. The cylinder is also provided at bottom and around inlet $a$ with an upstanding flange $b'$, the upper edge of which flange forms the main valve seat, and is preferably rounded or beveled so that no foreign matters will find a place of lodgment thereon. Within the flange $b$ may be formed opposite inwardly projecting lugs $b^2$ which can be engaged by a suitable tool for the purpose of placing or removing the cylinder B in or from the casing. In the lower part of the cylinder B, adjacent the flange $b'$, are formed a series of openings $b^3$ to permit fluid to circulate freely between the interior of cylinder B and the casing.

Slidably fitted within the cylinder B is a cylindrical main or pressure controlling valve C, which is of a diameter to fit closely but not tightly within the cylinder B, which latter forms a guide for such valve. In the lower end of the pressure valve C is an annular recess $c$ which is dove-tailed in cross section, being wider at its bottom or inner end, than at its mouth. And in said channel is placed a rubber gasket R which is retained in the channel by interlocking its edges with the edges of the channel. Concentric to the channel $c$ is a depending nipple $c'$ which depends preferably at least one-eighth of an inch below the washer and is of a diameter to fit easily but closely within the annular flange $b'$ in the bottom of cylinder B. In this nipple is an opening $c^2$ through which water freely passes to the interior of valve C above the washer. The upper end of valve C is closed by a removable screw cap C' as indicated in the drawings. The pressure valve C is divided by an internal partition $c^3$ into return valve chamber $c^5$, and a passage $c^4$ which communicate at top below the cap C'; and passage $c^4$ communicates at bottom with opening $c^2$. The bottom of chamber $c^5$ is closed by partition $c^6$ having a central aperture surrounded by an upstanding annular flange $c^7$ the upper end of which is preferably rounded so as to form a valve seat for a return-valve D, and the space or passage $c^9$ below the seat $c^7$ is separated from the chamber $c^4$ and passage $c^2$ by a partition $c^8$, but communicates with the interior of the cylinder B through a lateral opening in the wall of the pressure valve. The return valve D rests upon seat $c^7$ and closes communication between the interior of the pressure valve C and interior of cylinder B; but when the return valve is lifted a direct communication is established between the passage $c^9$ and $c^4$ through an opening $c^{10}$ in partition $c^4$ adjacent the return valve.

The return valve D is preferably provided with a cup-shaped body portion D' which fits closely but loosely within the chamber $c^5$, and with a disk portion $D^2$ overlying the seat $c^7$, said disk having an annular channel $d$ in its lower face dove-tailed in cross section, in which channel is fixed a rubber gasket or washer $r$, substantially similar to the washer R of the pressure valve.

Upon the top of pressure valve C may be placed a weight F which may be of any suitable material and of such size and weight as will hold valve C with desired pressure on seat $b'$. In hot water heating systems the weight would be ordinarily proportioned to hold valve C closed at and below a pressure of about ten pounds in the system, and to close said valve instantly if the normal pressure should decrease. So long as valve C is closed fluid cannot flow from the heating system into the casing A, and return valve D will be held closed on its seat by reason of the pressure of the water against the upper side thereof; but if the pressure exceeds the desired limit, say ten pounds, the valve C will be raised and water will flow through apertures $b^3$ into the casing A and escape thence through opening $a'$ into the overflow tank or receiver. It will be understood that the heating pipes are to be connected to casing A at the point $a$, and the overflow tank is to be connected to casing A at the point $a'$. When the pressure returns to the desired point valve C instantly closes and if the pressure falls below the desired point, the back pressure from the expansion tank will unseat valve D and water will flow back into the casing A through $a'$ and thence through $b^3$, $c^9$, $c^{10}$, $c^2$ and $a$ back into the heating system.

The nipple or shield $c'$ is made to depend below the washer so as to cause the valve C to rise and lift the washer entirely off the seat before any particles could pass up over the top of the flange $b'$; this renders it impossible for any foreign particles to collect and be held on the edge of the valve seat, and insures a clean full closure of the valve when it returns to its seat.

By reason of the peculiar dove-tailed shape of the washer channels in the valves, the washers are held in position without any clamps and are permitted slight lateral expansion in the grooves; and I have found that this novel mode of attaching the washers to the valves gives very excellent results in the practical operation thereof and greatly lessens the cost. A small hole $d^3$ may be drilled in the cup-shaped guide portion of valve D to allow the water to drain therefrom.

Operation: When the valve is connected to a hot fluid heating system, and expansion of the fluid takes place therein, pressure is exerted on return valve D and holds same on its seat allowing no water to pass into the casing A. After a pressure of—say ten pounds is obtained, the pressure valve C will be forced off of its seat allowing the water to pass through the ports in cylinder B into casing A from which, (by means of a pipe connected to its side opening $a'$) it flows freely to the expansion tank. If the pressure in the system is reduced, the water in the expansion tank will force valve D off of its seat inside of valve C and allow the water to again enter the system through the openings in valve C. It will be noted that there are no springs or levers or pivoted parts used in my valve; that there is practically no place for sediment or scale to collect and choke either the pressure or return valve; the parts B, C and D, are preferably made of brass, or non-corrodible metal so there is no danger of their sticking; and access can be had to all the parts at any time by simply removing the caps $a^2$ and C' without taking down any part of the system.

Having described my invention what I claim as new and desire to secure by Letters Patent is:

1. In a pressure regulating valve, the combination of a casing having an inlet adapted to communicate with a heating system, and an opening adapted to communicate with an expansion tank, a cylinder therein communicating with the inlet of the casing and having a raised valve seat surrounding the inlet and provided with apertures in its walls exterior to the valve seat, a pressure valve in the cylinder adapted to close said inlet, and having a return valve chamber and a passage connecting the return valve chamber with the inlet of the pressure valve, and a passage leading from the return valve chamber to the casing, and a return valve in said chamber opening contrary to the pressure valve, substantially as described.

2. In combination a casing having an inlet adapted to communicate with a heating system, and an opening adapted to communicate with an expansion tank, a cylinder secured in the casing and having a valve seat around and communicating with the inlet, and having apertures in its walls exterior to said valve seat; a cylindric pressure valve slidably fitted in said cylinder and adapted to close said inlet when the valve is seated, said pressure valve having a compartment in continuous communication with the system when the pressure valve is closed, and a return valve in said compartment opening oppositely to the main valve, said pressure valve also having a passage leading from said return valve adapted to communicate with the interior of the casing through one of the openings in the cylinder.

3. In combination, a casing having an inlet adapted to communicate with a heating system, and an opening adapted to communicate with an expansion tank, a cylinder secured in the casing and having an inwardly projecting flange forming a valve seat around and communicating with the inlet, said cylinder having apertures in its walls exterior to said valve seat; a cylindric main valve slidably fitted in said cylinder and adapted to close said inlet when the valve is seated, said main valve being divided into compartments, one of said compartments being in continuous communication with the casing when the valve is closed, and said main valve also having an auxiliary valve seat in its other compartment, and a passage leading from said auxiliary valve seat through the side of the main valve and adapted to communicate with the interior of the casing through one of the openings in the cylinder, and an auxiliary valve in said compartment adapted to normally close said passage but to open to permit return of water to the system.

4. In combination, a casing having an inlet adapted to communicate with a heating system, and an opening adapted to communicate with an expansion tank, a cylinder secured in the casing having an inwardly projecting flange forming a valve seat around and communicating with said inlet and having apertures in its walls exterior to said valve seat, a main valve slidably fitted in said cylinder and adapted to close said inlet when the valve is seated, said main valve having a return valve chamber in continuous communication with the inlet of the casing, and a passage leading from said chamber through the side of the main valve and adapted to communicate with the interior of the casing through one of the openings in the cylinder, and a return valve in the return valve chamber adapted to open to permit return of water to the system.

5. In a pressure regulating valve for fluid heating systems the combination of a casing having an inlet in its bottom adapted to be connected with the heating system, and an opening adapted to be connected with the expansion tank, and an upstanding annular flange surrounding the inlet of the casing and forming an annular valve seat, a hollow cylindrical main valve having a nipple on its lower end adapted to project into said flange, and having an annular chamber, with a return valve seat in its lower end, and a passage extending through the nipple and communicating with said chamber above the return valve seat and a passage leading from said return valve seat through an opening in the wall of the pressure valve; with a return valve in said chamber opening contrary to the main valve and adapted to close communication between said passages while the pressure in the system is at or above the normal, and a washer surrounding said nipple adapted to rest on said seat when the valve is closed, substantially as described.

6. In a pressure regulating valve for fluid heating systems the combination of a casing having an opening in its bottom adapted to be connected with the heating system, and another opening adapted to be connected to an overflow tank, a cylinder in said casing having an upstanding flange surrounding the inlet and forming an annular valve seat, and having slots in its walls adjacent said valve seat; a hollow cylindrical pressure valve slidably fitted in said cylinder and having its lower end adapted to close said inlet and having a return valve chamber above the inlet, and a passage leading from said return valve chamber to the inlet, and a second passage opening through the wall of the main valve; with a return valve in said chamber opening contrary to the main valve adapted to close communication between said passages while the pressure in the system is at or above the normal, and a weight connected with said pressure valve for holding the same upon its seat.

7. In a pressure regulating valve, the combination of a casing having an inlet adapted to communicate with a heating system, and an opening adapted to communicate with an expansion tank, a cylinder therein having a valve seat communicating with the inlet of the casing; a main valve in the cylinder having its lower end adapted to close said seat when the valve is closed and having a return valve chamber, and a passage connecting the return valve chamber with the inlet and a passage leading from the return valve chamber and communicating with the casing through the cylinder; with a normally closed return valve in said chamber opening oppositely to the main valve.

8. In combination, a casing having an inlet opening adapted to communicate with a fluid heating system and an opening adapted to communicate with an expansion tank, and an annular flange within the casing surrounding said inlet opening and projecting upwardly therefrom; and a hollow pressure valve within the casing having a depending annular nipple adapted to enter the said annular flange and having a washer surrounding the nipple adapted to rest upon the top of the flange when the valve is closed said pressure valve, also having a return passage or port adapted to communicate with the expansion tank; with a return valve, within the pressure valve, adapted to close said return passage and opening in a direction of flow contrary to the main valve and in constant communication at one side with the fluid pressure in the system, and adapted to be unseated by the back flow when the pressure in said system falls below the normal.

9. The combination of a casing having an inlet adapted to communicate with a heating system, and an opening adapted to communicate with an expansion tank; a cylinder therein provided with an inlet in its bottom, in communication with the inlet of the casing; a cylindrical valve slidably fitted within said cylinder and having a nipple on its lower end and an opening in the side of the valve above the nipple, said valve also having a partition dividing it into two chambers, one of which communicates with the inlet and the other with the outlet of the cylindrical valve, a return valve seat in the chamber of the main valve, and a slidable valve normally seated on the return valve seat and opening oppositely to the main valve.

10. In combination, a casing having an inlet adapted to communicate with a heating system and an opening adapted to communicate with an expansion tank; a cylinder therein provided with an inlet in its bottom communicating with the inlet to the casing, and an opening in its side communicating with the expansion tank; a cylindrical pressure valve slidably fitted in said cylinder and having a nipple on its lower end and an annular channel surrounding the nipple and a return passage communicating with the expansion tank; and a washer fitted in said channel; with a return valve in said pressure valve adapted to close the said return passage, and opening on a return flow, substantially as described.

In testimony that I claim the foregoing as my own, I affix my signature in presence of two witnesses.

EDMUND F. GEBHARDT.

Witnesses:
PETER W. HAY,
W. A. KEMMERER.